United States Patent
Marchini et al.

(10) Patent No.: US 10,479,035 B2
(45) Date of Patent: Nov. 19, 2019

(54) METHOD FOR MANAGING THE PRODUCTION CYCLE OF A PLANT IN A PROCESS FOR BUILDING TYRES FOR VEHICLE WHEELS

(71) Applicant: PIRELLI TYRE S.P.A., Milan (IT)

(72) Inventors: Maurizio Marchini, Milan (IT); Albert Berenguer, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 14/363,137

(22) PCT Filed: Nov. 27, 2012

(86) PCT No.: PCT/IB2012/056757
§ 371 (c)(1),
(2) Date: Jun. 5, 2014

(87) PCT Pub. No.: WO2013/088288
PCT Pub. Date: Jun. 20, 2013

(65) Prior Publication Data
US 2014/0345783 A1    Nov. 27, 2014

Related U.S. Application Data

(60) Provisional application No. 61/579,540, filed on Dec. 22, 2011.

(30) Foreign Application Priority Data

Dec. 14, 2011   (IT) ............................. MI2011A2259

(51) Int. Cl.
*B29D 30/48* (2006.01)
*B29D 30/00* (2006.01)
(Continued)

(52) U.S. Cl.
CPC ............ *B29D 30/0016* (2013.01); *B25J 11/00* (2013.01); *B29D 30/18* (2013.01); *B29D 30/32* (2013.01);
(Continued)

(58) Field of Classification Search
CPC ............ B29D 30/0016; B29D 30/0044; B29D 30/18; B29D 30/32; B29D 30/48; B29D 2030/3207
See application file for complete search history.

(56) References Cited

U.S. PATENT DOCUMENTS 1,732,776 A    10/1929  Shively
4,683,020 A *  7/1987   Portalupi ........... B29D 30/0016
                                                    156/131

(Continued)

FOREIGN PATENT DOCUMENTS

DE    10 2006 051 540    5/2008
EP         0 903 218     3/1999
(Continued)

OTHER PUBLICATIONS

Machine generated English language translation of JP 2004-255769 (original document dated Sep. 2004) (Year: 2004).*
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method and a plant for managing the production cycle of a plant for building tires for vehicle wheels, wherein the plant provides for a storage region for anchoring annular structures and a plurality of processing stations at least one of which is associated with a forming drum, includes feeding a plurality of anchoring annular structures to the storage region, picking up the anchoring annular structures from the
(Continued)

storage region at a predetermined picking-up position that does not change on changing of the types of the anchoring annular structures, and feeding the picked-up anchoring annular structures to the processing station associated with the forming drum.

6 Claims, 7 Drawing Sheets

(51) Int. Cl.
    *B25J 11/00*     (2006.01)
    *B29D 30/32*     (2006.01)
    *B29D 30/18*     (2006.01)

(52) U.S. Cl.
    CPC ...... *B29D 30/48* (2013.01); *B29D 2030/0044* (2013.01)

(56) References Cited

U.S. PATENT DOCUMENTS

| | | | | |
|---|---|---|---|---|
| 4,806,196 | A * | 2/1989 | Smith | B29D 30/48 |
| | | | | 140/88 |
| 5,336,358 | A * | 8/1994 | Kawaguchi | B29D 30/50 |
| | | | | 156/396 |
| 6,979,378 | B2 * | 12/2005 | Okada | B29D 30/00 |
| | | | | 156/111 |
| 2003/0170336 | A1 * | 9/2003 | Caretta | B29D 30/0016 |
| | | | | 425/340 |
| 2007/0215265 | A1 | 9/2007 | Sata | |
| 2007/0272345 | A1 * | 11/2007 | Sawada | B29D 30/32 |
| | | | | 156/131 |
| 2009/0314436 | A1 * | 12/2009 | Tatara | B29D 30/0016 |
| | | | | 156/398 |
| 2010/0043947 | A1 | 2/2010 | Janszen et al. | |

FOREIGN PATENT DOCUMENTS

| | | | | |
|---|---|---|---|---|
| EP | 1 683 628 | | 7/2006 | |
| EP | 1 724 100 | | 11/2006 | |
| FR | 2 586 376 | | 2/1987 | |
| JP | 2002-59491 | | 2/2002 | |
| JP | 2002-059491 A | * | 2/2002 | |
| JP | 2004-255576 A | * | 9/2004 | |
| JP | 2004-255769 | * | 9/2004 | ............ B29D 30/48 |
| SU | 1597294 | | 10/1990 | |
| WO | WO 2010/064066 | | 6/2010 | |
| WO | WO 2010/070374 | * | 6/2010 | ............ B29D 30/20 |

OTHER PUBLICATIONS

International Search Report from the European Patent Office for International Application No. PCT/IB2012/056757, dated Apr. 16, 2013.

Notification of the First Office Action dated Nov. 13, 2015, from the Patent Office of the People's Republic of China in counterpart Chinese Patent Application No. 201280066190.6.

Office Action in related Russian patent application No. 2014127689/05, dated Nov. 7, 2016.

* cited by examiner

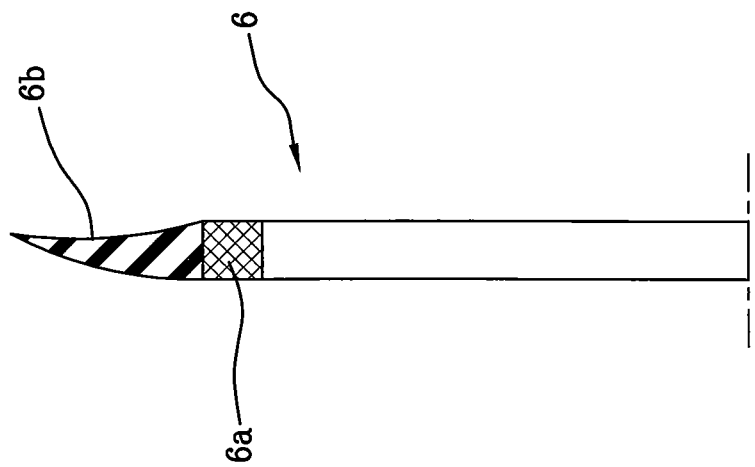
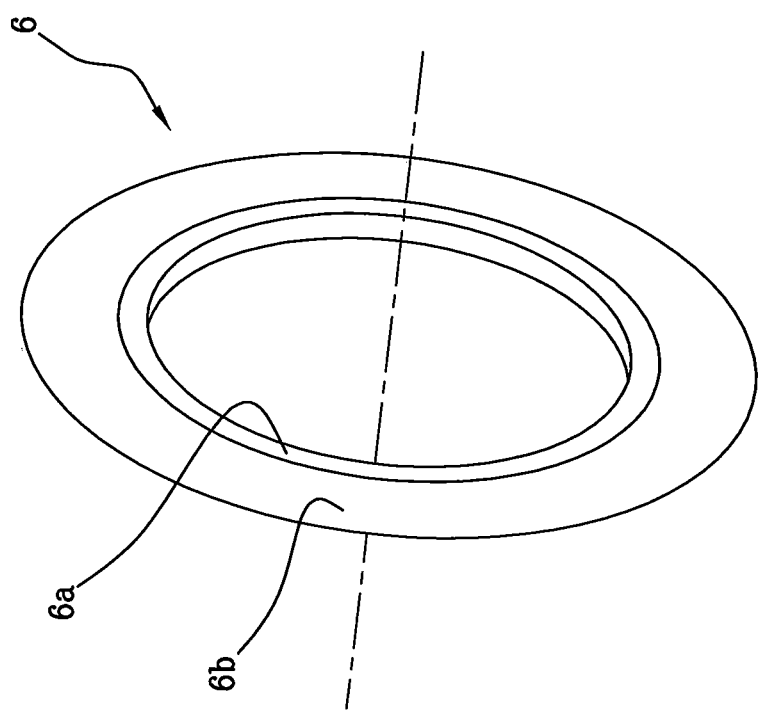

METHOD FOR MANAGING THE PRODUCTION CYCLE OF A PLANT IN A PROCESS FOR BUILDING TYRES FOR VEHICLE WHEELS

CROSS REFERENCE TO RELATED APPLICATIONS

This application is a national phase application based on PCT/IB2012/056757, filed Nov. 27, 2012, and claims the priority of Italian Patent Application No. MI2011A002259, filed Dec. 14, 2011, and the benefit of U.S. Provisional Application No. 61/579,540, filed Dec. 22, 2011, the content of each application being incorporated herein by reference.

BACKGROUND OF THE INVENTION

Field of the Invention

The present invention aims at providing a method for managing the production cycle of a plant in a process for building tyres for vehicle wheels.

In particular, the present invention refers to a method for managing the production cycle of a plant in a process for building tyres for vehicle wheels and a transfer apparatus for feeding anchoring annular structures to a forming drum of the plant.

Description of the Related Art

A tyre for vehicle wheels generally comprises a carcass structure comprising at least one carcass ply having relatively opposite terminal zones engaged to respective anchoring annular structures, integrated in the regions usually referred to by the name of "beads", having an internal diameter substantially corresponding to a so-called "seating diameter" of the tyre on a relative rim.

The expression "anchoring annular structure" is used to indicate a component of the tyre comprising at least one bead ring. Preferably such component further comprises a filling insert. Even more preferably such component comprises a bead ring and filling insert both enclosed by an edge.

The expression "type" of an anchoring annular structure is used to indicate the entirety of the geometric characteristics (for example: the seating extent of the bead ring, type of section of the bead ring and the dimensions thereof, dimensions of the possible filling insert, positioning and dimensions of the edge, inner and outer circumferential edge of the bead ring and of the anchoring annular structure in its entirety) and technologies (for example: material and characteristic threads/cords of the bead ring, elastomeric material associated with said threads/cords of the bead ring, elastomeric material of the possible filling insert, elastomeric material of the possible edge, material, characteristics of possible cords present in the edge) of the same.

The expression "homogeneous group of anchoring annular structures", is used to indicate a plurality of anchoring annular structures sharing one or more identical characteristics, such as for example the seating extent of the bead ring, the type of section of the bead ring, the dimensions thereof, the dimensions of the possible filling insert, the positioning and the dimensions of the edge, the inner and outer circumferential length of the bead ring, the material and the characteristics of the threads/cords of the bead ring, the elastomeric material associated with said threads/cords of the bead ring, the elastomeric material of the possible filling insert, the elastomeric material of the possible edge.

The expression "predetermined picking-up position that does not change" is used to indicate, a position in the space, i.e. a series of spatial coordinates (referring to a fixed reference), which is known a priori (given the geometry of a plant or of a portion thereof) and which remains constant over time. More precisely said "predetermined position that does not change" remains constant between one picking up, a previous picking up and a subsequent picking up of an anchoring annular structure. In other words, the expression predetermined picking-up and non-changing position is used to indicate a known position based on technical specifications of the plant which remains identical to itself regardless of the number and type of anchoring annular structures picked up.

Such position may change on changing the portions composing the plant itself.

Document WO 2010/70374, on behalf of the Applicant, describes a plant and a process for building green tyres for vehicle wheels. The process comprises: building a carcass structure on a first forming drum in at least one carcass structure building line comprising a plurality of work stations disposed according to a sequential series, wherein the carcass structure comprises at least one carcass ply and a pair of anchoring annular structures; building a crown structure on at least one second building drum in at least one crown structure building line comprising a plurality of work stations disposed according to a sequential series, wherein the crown structure comprises at least one belt structure; toroidal shaping of the carcass structure assembling it with the crown structure in at least one shaping and assembling station. The carcass structure building line comprises a work station for applying a pair of the aforementioned anchoring annular structures to the opposite axial ends of the carcass ply/plies and it may also be provided with devices for turning up the ends of the carcass ply/plies of the carcass ply itself so as to form loops containing the anchoring annular structures.

Document US 2009/0314436 A1 describes a system for stocking and feeding beads in a machine for manufacturing tyres. Such system comprises a stocking unit provided with transfer means for transferring the beads towards an end of the same unit. A unit for transferring beads picks up a bead ring at a time from the end of the stocking unit and transfers it to a station for producing tyres at building drums.

Document EP 903 218 A2 describes a device for automatically feeding beads in a machine for building tyres. A plurality of beads are disposed on a chain conveyor of a bead stocking device. The beads are fed to a pair of portions for holding the beads mounted on an arm of a robot for transferring the beads which provides for transferring them to a station of the tyre building machine. A plate for removing the beads from the stocking device acts between the bead holding portions and the stocking device. Such removal plate picks up the beads from the stocking device and takes them to the bead holding portions.

SUMMARY OF THE INVENTION

The Applicant observed that modern tyre production plants increasingly require a high production speed even considering the production of a plurality of batches with different technical characteristics. Such request depends on the constantly changing market needs that require the diversification of production, for example requiring specific tyres for each automobile and/or motor vehicle model.

In automatic tyre building plants, for example of the type described in WO 2010/70374, the Applicant observed the need of increasing the reproducibility of the quality standards in different batches (be they batches with identical technical specifications or batches with different technical specifications), so as to be able to guarantee the same quality standard in all produced batches.

More in particular, the Applicant perceived the importance of managing the constituting elements of the tyre that are fed to stations for forming the same in the most accurate manner possible.

More in particular, between said constituting elements, the Applicant perceived the need of managing a high number of anchoring annular structures, even of different types, intended for building tyres, in the most accurate manner possible.

The Applicant also observed that fixing the position for picking up the anchoring annular structures, regardless of their type, for the subsequent use thereof, allows obtaining a reliable and repeatable succession of building steps automatically so as to obtain tyres built with a high and substantially constant quality standard.

The Applicant thus found that, picking up anchoring annular structures from a storage region in which the picking-up position that does not change on changing of the types of the anchoring annular structures is predetermined, allows feeding the anchoring annular structures to a forming drum associated with a processing station in an extremely accurate and repeatable manner.

More specifically, according to a first aspect, the present invention relates to a method for managing the production cycle of a plant for building tyres for vehicle wheels, said plant being provided with a storage region for anchoring annular structures and a plurality of processing stations at least one of which being associated with a forming drum.

Said method comprises at least one of the following actions:

a) feeding a plurality of anchoring annular structures to said storage region;

b) picking up said anchoring annular structures from said storage region at a predetermined picking-up position that does not change on changing of the types of the anchoring annular structures;

c) feeding the picked-up anchoring annular structures to the processing station associated with the forming drum.

Thus, the Applicant deems it possible to provide feeding anchoring annular structures identical or different from each other from a geometric or technological point of view in a precise, accurate and repeatable manner. Thus, the quality standard of the tyres is substantially constant both on changing the type of the anchoring annular structures (required to guarantee a suitable production flexibility of the plant), and inside the same type.

According to a second aspect, the present invention relates to a process for building tyres involving use of a storage region for at least one basket containing a plurality of anchoring annular structures and at least one forming drum associated with a processing station designed to receive pairs of anchoring annular structures during the processing of a tyre being formed.

Preferably, the feeding of the anchoring annular structures to said processing station comprises:

picking up, by means of a picking up device, the anchoring annular structures from the basket at a predetermined picking-up position that does not change on changing of the types of anchoring annular structures.

According to a third aspect, the present invention relates to a transfer apparatus for feeding anchoring annular structures to a forming drum associated with a processing station for building tyres for vehicle wheels.

Said apparatus comprises at least one of the following characteristics:

at least one basket designed to house a plurality of anchoring annular structures;

a picking up device movable between a picking-up position and at least one release position for picking up anchoring annular structures from the basket and releasing the same to the aforementioned forming drum;

said picking-up position being predetermined that does not change on changing of the types of anchoring annular structures.

According to a fourth aspect, the present invention relates to a plant for building tyres for vehicle wheels comprising:

a plurality of processing stations;

a storage region for anchoring annular structures;

a transfer apparatus according to the third aspect of the present invention.

The present invention, in at least one of the aforementioned aspects, may have one or more of the preferred characteristics described hereinafter.

In the method of the present invention there may be provided for the additional actions of:

feeding in succession each anchoring annular structure in said picking-up position.

According to this characteristic it is possible to continue picking up anchoring annular structures from the picking-up position.

Preferably, action a) comprises: orderly arranging the anchoring annular structures supporting them at a support portion of the same.

More preferably action b) comprises: picking up each anchoring annular structure at a picking up portion coinciding with said support portion.

Supporting the anchoring annular structures at the picking up portion allows obtaining that the picking-up position shall be actually occupied by the anchoring annular structure to be picked up.

Preferably, action b) comprises: picking up each anchoring annular structure at a picking up portion of the same placed inside a single circular sector of the anchoring annular structure.

According to this characteristic it is not necessary to definitely know the absolute position of the entire anchoring annular structure to perform the picking up thereof.

Preferably, each anchoring annular structure is separated from another at least at the respective picking up portion.

Separating the anchoring annular structures from each other allows picking up the same without interfering with the anchoring annular structures still to be picked up.

In a preferred embodiment of the invention, there is provided for the action of:

d) feeding an anchoring annular structure to the position previously occupied by the picked-up anchoring annular structure.

Thus being provided, there is obtained the continuity of the process of picking up anchoring annular structures.

Preferably, action a) comprises: feeding a plurality of groups of anchoring annular structures to said storage region; action b) being defined for each group.

Given that there is a plurality of groups of anchoring annular structures, it is possible to change the type of anchoring annular structure to be transferred to the forming drum without interrupting the transfer continuity, i.e. without reducing the maximum production capacity of the plant.

In a preferred embodiment there is provided at least one of the following actions:

feeding anchoring annular structures to support members provided on the basket;

moving each support member along a first path between an initial position and said picking-up position;

picking up the anchoring annular structure from the support member occupying the picking-up position.

According to these functions, it is possible to continuously feed the picking-up position with anchoring annular structures.

Preferably, the anchoring annular structures are laid in seats for housing the support members.

More preferably, said picking up device picks up the anchoring annular structures by at least partly entering the housing seats.

Thus, the anchoring annular structures are "hanged" in the housing seats and, given the typical annular shape thereof, the diameter of each anchoring annular structure does not affect the position that the latter assumes in the housing seat.

With the at least partial entry of the picking up device inside the housing seats it is obtained that the picking up portion of each anchoring annular structure actually coincides with the portion engaged in the housing seat.

According to the invention, it is preferably provided for moving each support member along a second path between said picking-up position and said initial position after picking up the anchoring annular structure.

Preferably, each anchoring annular structure is picked up from the basket at a picking up portion of the same placed inside a single circular sector.

Such picking up portion may be continuous or discrete.

Preferably, the width of the circular sector containing the picking up portion is comprised between about 1° and about 90°.

Even more preferably such width is comprised between about 1° and about 30°.

Preferably, the feeding of the anchoring annular structures to the support members comprises:

stabilising each anchoring annular structure by means of stabilising members provided on the basket and active on the anchoring annular structures in positions substantially diametrically opposite thereto relative to the support members.

Preferably, there is provided for moving said support members and said stabilising members in synchronism towards the picking-up position and away therefrom.

The stabilisation of the anchoring annular structures prevents the same from slipping or oscillating during the storage and transport thereof towards the picking-up position.

According to the invention there is preferably provided for moving said stabilising members relative to said support members on changing the type of anchoring annular structures.

Thus, regardless of the type of anchoring annular structure (for example the diameter) it is obtained that the same does not oscillate or slip.

Preferably, there is provided for supplying the basket with anchoring annular structures pulling the basket out of an operating position and making it face a loading region of the storage region.

This allows minimising the overall dimensions required for the plant, given that the baskets exceed the overall dimensions usually occupied only for the time required for the filling thereof.

It is also preferable to provide for the function of providing a plurality of baskets in the storage region each of said baskets being designed to house a homogeneous group of anchoring annular structures, a picking-up position being defined for each basket.

Preferably, the basket comprises:

support members provided for supporting said anchoring annular structures.

More preferably the basket comprises:

first advancing members, acting on said support members, designed to move each support member along a first path between an initial position and said picking-up position, and along a second path between said picking-up position and said initial position.

Preferably, the picking up device, in the picking-up position, acts on the support member occupying said picking-up position.

Preferably, each support member comprises a housing seat designed to receive an anchoring annular structure in a resting position.

More preferably said housing seat comprises an abutment wall designed to receive a front portion of an anchoring annular structure in a resting position.

The abutment wall allows the anchoring annular structure to actually occupy a known position within the basket.

Preferably, the abutment wall comprises at least one recess designed to face the anchoring annular structure outside the housing seat.

Preferably the picking up device comprises at least one grip member smaller than said recess for at least partly penetrating into the housing seat.

In a preferred embodiment of the invention, preferably the picking up device comprises a position compensating element acting on said grip member.

More preferably, said position compensating element is designed to calibrate a grasping movement of the grip member for grasping said anchoring annular structures.

The position compensating element allows gripping the anchoring annular structure precisely in the position it is located, thus preventing the grip member from displacing the anchoring annular structure during the grasping, i.e. before it is actually grasped.

Preferably, the housing seat comprises a lead-in shim having an inclined surface designed to position the anchoring annular structure against the abutment wall.

This allows the anchoring annular structure to be actually laid against the abutment wall.

Preferably, the basket comprises stabilising members provided for engaging said anchoring annular structures.

More preferably, said stabilising members are placed below said support members.

In a preferred embodiment of the invention, preferably the basket comprises actuating members acting on said stabilising members designed to vary the distance between said stabilising members and said support members.

Preferably, the basket comprises second advancing members acting on said stabilising members and synchronous with said first advancing members for moving said support members and said stabilising members in synchronism.

Preferably, each stabilising member comprises a housing seat designed to come into contact with an anchoring annular structure.

More preferably, said housing seat comprises an abutment wall designed to receive a rear portion, opposite to a front portion, of an anchoring annular structure in a resting position.

The abutment wall of the housing seat of the stabilising member prevents any macroscopic movement of the anchoring annular structure during the movement thereof.

Preferably, said first advancing members and second advancing members respectively comprise: two pulleys on which a belt or chain is wound; at least one of said two pulleys being interlocked with an electric motor.

Preferably, said housing seats of the support members and of the stabilising members are placed along the whole extension of said belt or chain.

Thus, the support members and the stabilising members engage anchoring annular structures only during the movement towards the picking-up position, returning to the initial position empty.

Preferably there is provided for a slide associated with said basket; said slide being movable between a first loading position of the basket and an operating position of the basket.

Preferably, said slide comprises a support structure to which said first advancing members and second advancing members, said support members and said stabilising members are constrained.

In a preferred embodiment of the invention, there is preferably provided for a plurality of baskets each of said baskets being designed to house a homogeneous group of anchoring annular structures; a picking-up position being defined for each basket.

Further characteristics and advantages shall be more apparent from the detailed description of a preferred but non-exclusive embodiment of a method and a plant for managing the production cycle in a process for building tyres for vehicle wheels and a transfer apparatus for feeding anchoring annular structures to a forming drum of the plant according to the present invention.

BRIEF DESCRIPTION OF THE DRAWINGS

Such description shall be outlined hereinafter with reference to the attached drawings, provided solely by way of non-limiting example, wherein:

FIG. 3 illustrates an anchoring annular structure part of the tyre of FIG. 2;

FIG. 4 is a radial section of the anchoring annular structure of FIG. 3;

With reference to the aforementioned figures, a plant for building vehicle tyres 2 according to the present invention was indicated in its entirety with 1.

DETAILED DESCRIPTION OF THE INVENTION

Figure 1:
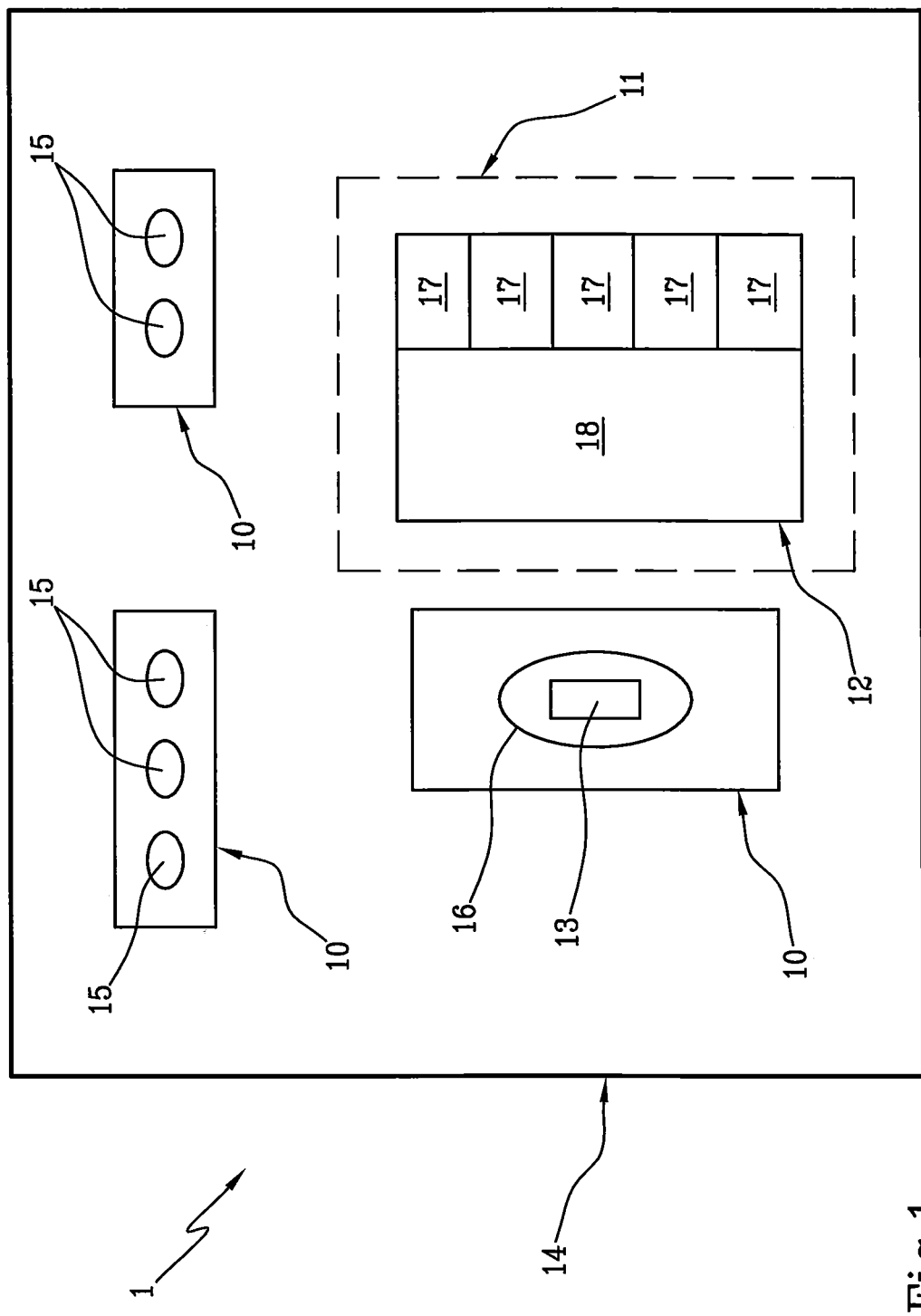
FIG. 1 is a schematic representation of a plant for building tyres for vehicle wheels according to the present invention.
Figure 2:
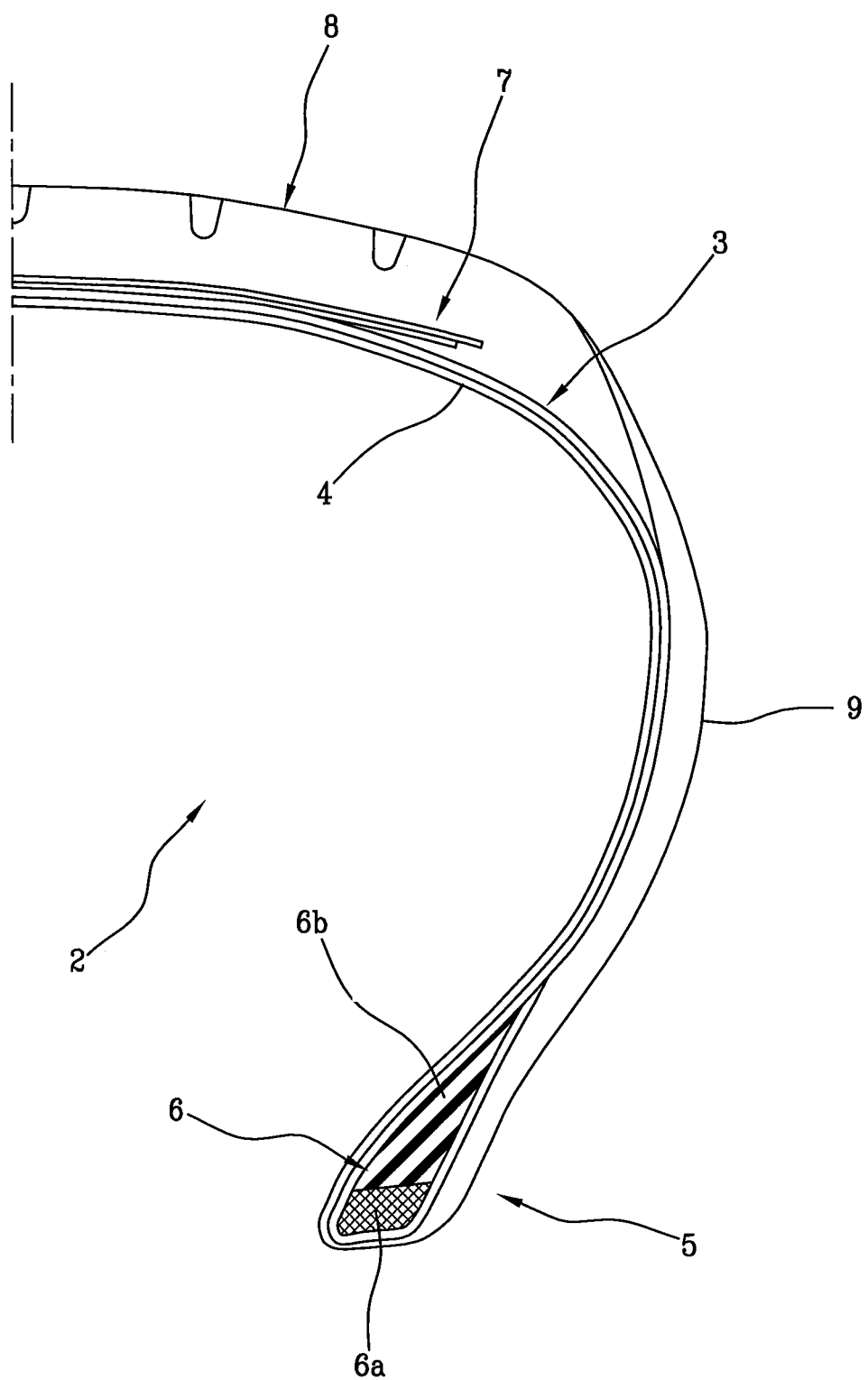
FIG. 2 schematically shows—in diametrical section—a tyre for vehicle wheels at least partly obtained with the plant of FIG. 1.

The tyres for vehicle wheels built in the plant 1 are of the type (see FIG. 2) essentially comprising at least one carcass ply 3 preferably internally covered by a layer of impermeable elastomeric material or so-called liner 4, two so-called "beads" 5 respectively integrating anchoring annular structures 6 engaged to the circumferential edges of the carcass ply 3, a belt structure 7 applied in a position radially external to the carcass ply 3, a tread band 8 applied in a position radially external to the belt structure 7, in a so-called crown region of the tyre 2, and two side walls 9 applied in positions laterally opposite on the carcass ply 3, each at a lateral region of the tyre 2, extending from the respective bead 5 to the respective lateral edge of the tread band 8.

The anchoring annular structures 6 comprise (FIGS. 3 and 4) respective beads 6a possibly associated with elastomeric fillings 6b. Preferably, each bead ring 6a comprises metal threads and the elastomeric filling 6b is disposed in a radially external position around the bead ring 6a.

The plant 1 comprises a plurality of processing stations 10, a storage region 11 for the anchoring annular structures 6 and a transfer apparatus 12 active in the storage region 11 for transferring the anchoring annular structures 6 from the storage region 11 to a forming drum 13 associated with one of said processing stations 10.

Preferably, the processing stations 10 are part of a carcass structure building line 14, in which a carcass structure, comprising at least one of the carcass plies 3 and the anchoring annular structures 6, is formed on the forming drum 13.

The processing stations 10 of the building line 14 are for example a first station 10 which provides the liner 5, preferably by winding a continuous elongated element made of elastomeric material according to mutually approached turns and/or at least partly superimposed and distributed along the forming surface of the forming drum. Another processing station 10 may be provided to implement the production of one or more carcass plies 3, preferably obtained by depositing on the forming drum 13, in a circumferential approaching relation, strip-like elements obtained by cutting a continuous strip made of elastomeric material comprising parallel adjacently arranged fabric or metal cords to size. Within the aforementioned processing stations 10 there may be provided for one or more processing stations 15 in which the aforementioned actions are implemented.

Furthermore, on the carcass structure building line 14 there is disposed a processing station 10 dedicated to the integration of the anchoring annular structures 6 in at least one carcass ply 3, by applying the same anchoring annular structures 6 in axially external position at the zones of at least one carcass ply 3 abutted in the direction of the rotational axis of the forming drum 13, the zones being subsequently turned up around the anchoring annular structures 6.

The station 10 dedicated to the integration of the anchoring annular structures 6 comprises for example a processing station provided by a bead formation machine 16, for example of the type described in WO 2010/064066 on behalf of the Applicant.

The transfer apparatus 12 comprises at least one basket 17 designed to house a plurality of anchoring annular structures 6, a picking up device 18 (partly illustrated in FIG. 8) movable between a picking-up position and at least one release position for picking up anchoring annular structures 6 from the basket 17 and releasing the same to said processing station 10.

The picking-up position is predetermined and does not change on changing of the types of the anchoring annular structures 6.

Figure 5:
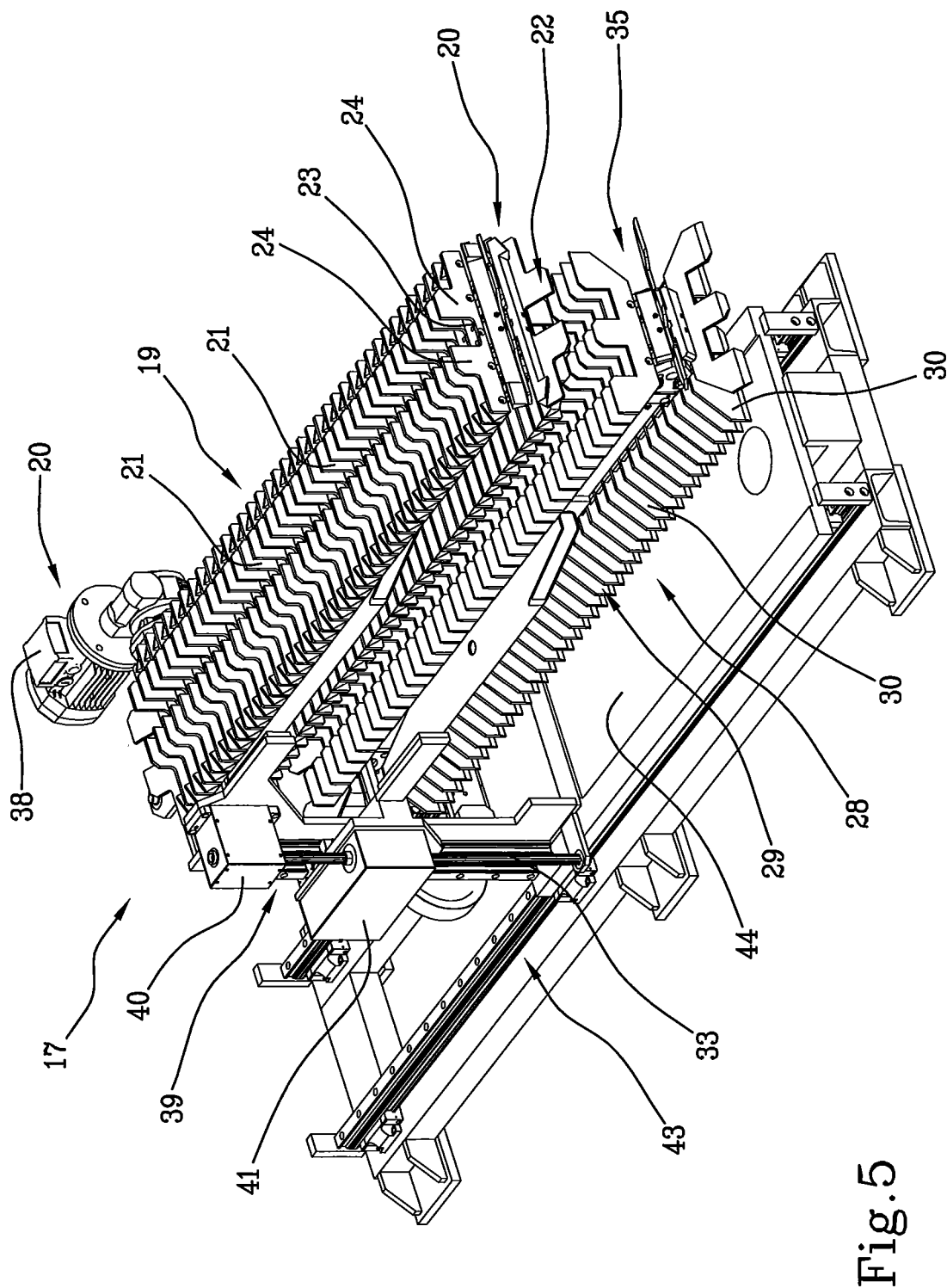
FIG. 5 is a perspective view of a basket part of the plant of FIG. 1.
Figure 6:
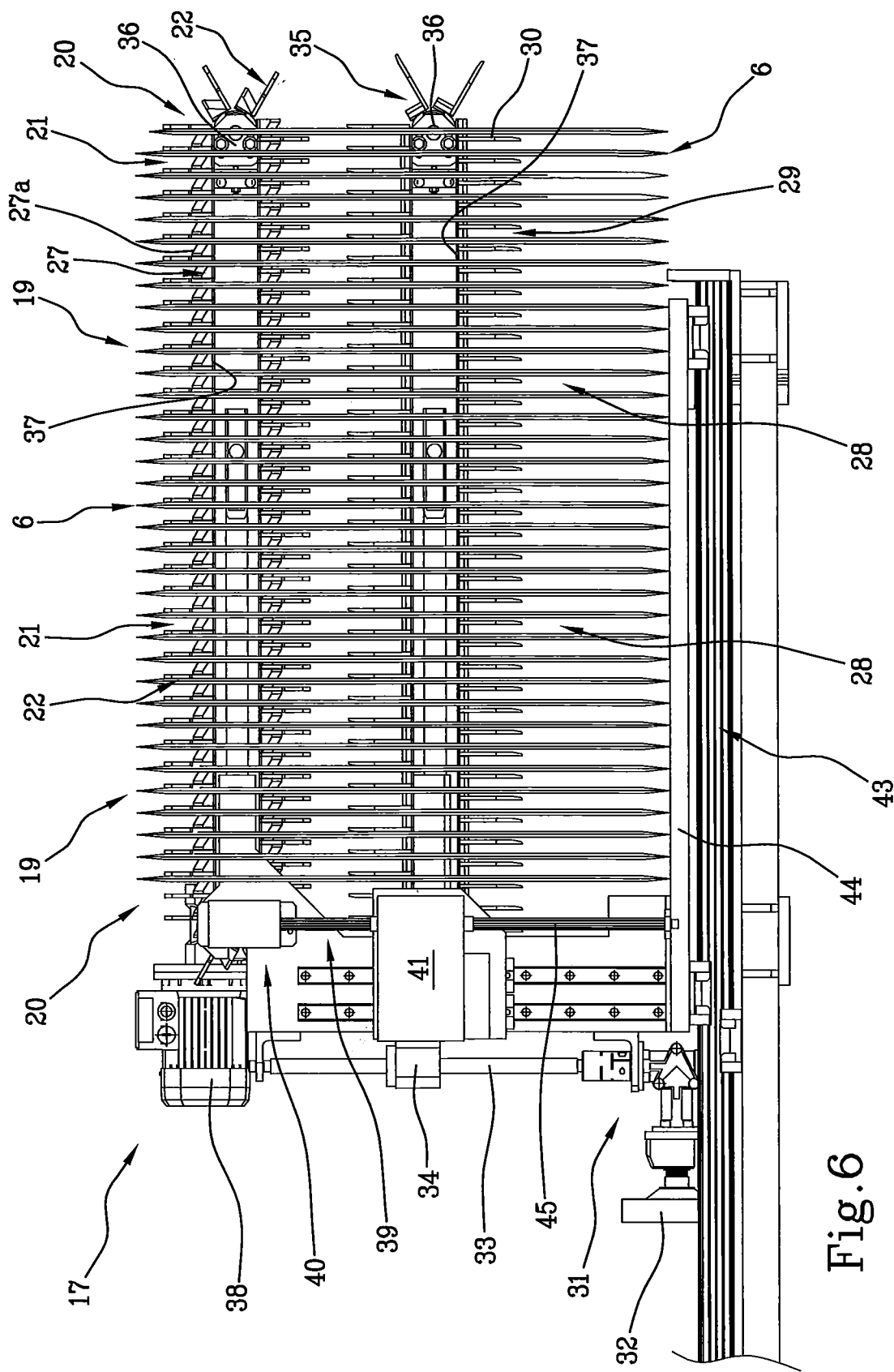
FIG. 6 is a lateral view of the basket of FIG. 5 provided with anchoring annular structures.
Figure 7:
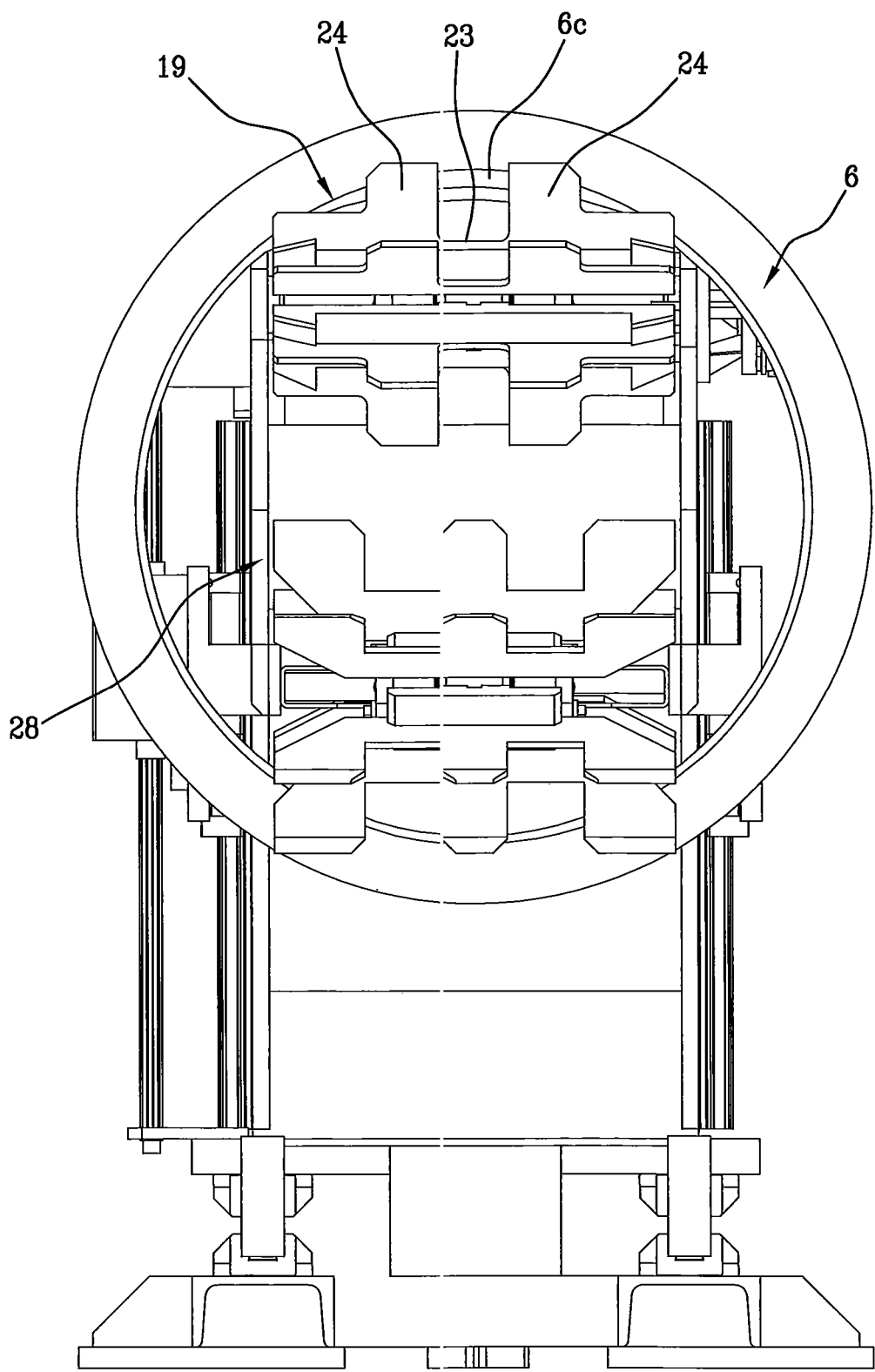
FIG. 7 is a front view of the basket of FIG. 6 with some parts removed for showing others better.

Preferably, the basket 17 comprises support members 19 (FIG. 5) provided for supporting the anchoring annular structures 6 (FIGS. 6 and 7).

Preferably, the basket 17 comprises first advancing members 20, active on the support members 19, designed to move each support member 19 along a first path between an initial position and the picking-up position, and along a second path between the picking-up position and the initial position.

In other words, the first advancing members 20 move the support members 19 to carry them in succession to the picking up area.

Preferably, the picking up device 18, in the picking-up position, acts on the support member 19 occupying the picking-up position, i.e. on the support member 19 directly facing the picking-up position.

Preferably, each support member 19 comprises a housing seat 21 designed to receive an anchoring annular structure 6 in a resting position. The housing seat 21 comprises an abutment wall 22 designed to receive a front portion 6c of an anchoring annular structure 6 in a resting position (FIGS. 5 and 6).

The expression front portion 6c of the anchoring annular structure 6 is used to indicate a surface of such structure facing towards the picking up portion. Analogously, the expression rear portion of the anchoring annular structure 6 is used to indicate the surface of such structure facing towards the opposite part relative to the picking up portion, i.e. the opposite portion relative to the front portion.

Preferably, the abutment wall 22 comprises at least one recess 23 designed to face the anchoring annular structure 6 outside the housing seat 21.

Such recess 23 of the abutment wall 22, i.e. an opening in the abutment wall 22, provides an interruption in the continuity of the abutment wall 22. Thus, the anchoring annular structure 6, at least in a portion thereof, is not at contact with the abutment wall 22 (FIG. 7).

Preferably, the recess 23 is delimited by two fins 24 part of the abutment wall 22 (FIG. 5).

In an embodiment of the present invention, the picking up device 18 is a robotized arm.

Said robotised arm may be of the anthropomorphic type.

Figure 8:
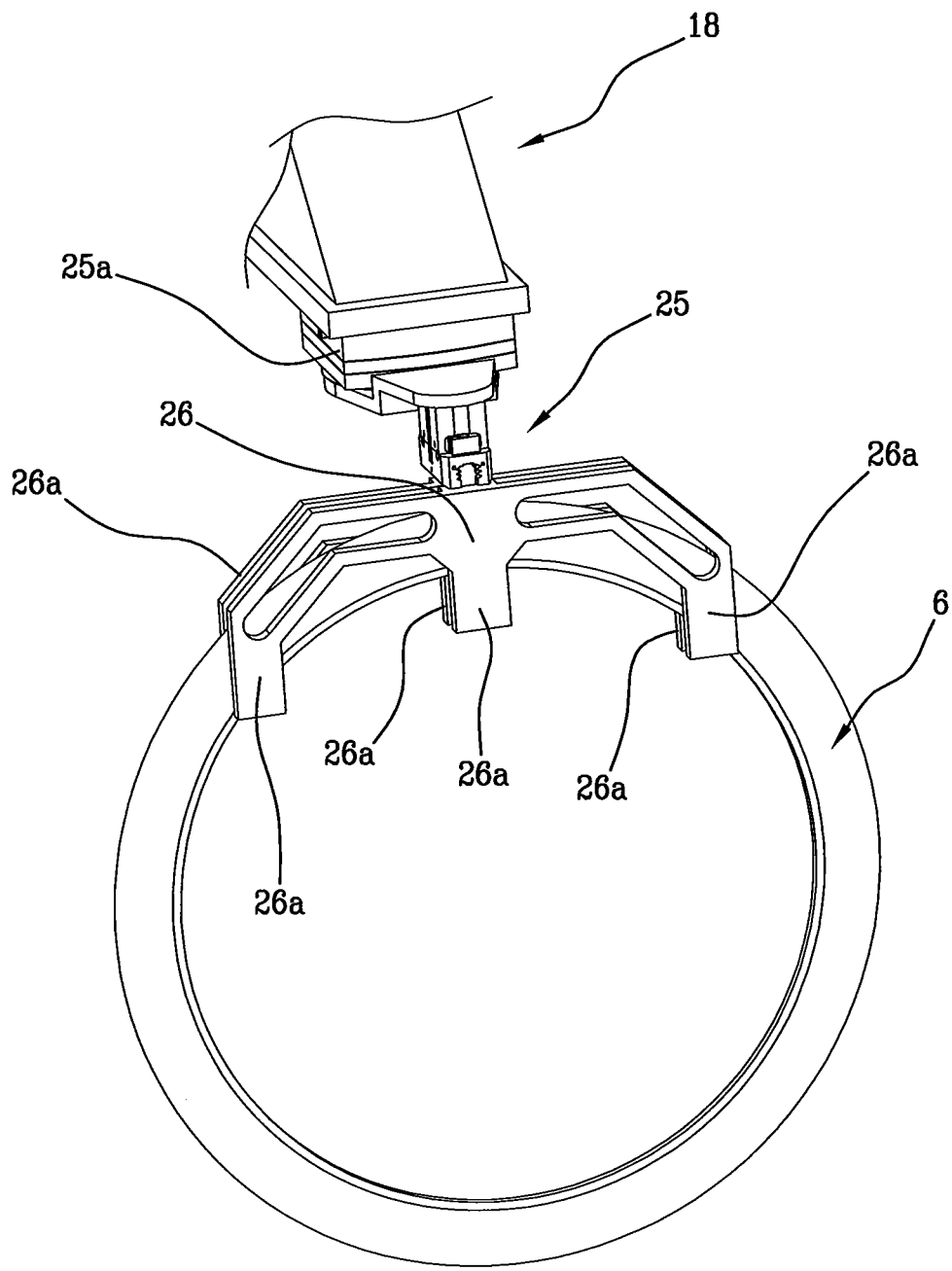
FIG. 8 is a detail of the basket of FIG. 6 in use condition.

The picking up device 18 comprises at least one grip member 25 having smaller dimensions than the recess 23 for at least partly penetrating into the housing seat 21 (FIG. 8).

In other words, the grip member 25 is adapted to be inserted into the recess 23 without mechanically interfering with the aforementioned fins 24 of the abutment wall 22.

Thus, the grip member 25 is capable of grasping the anchoring annular structure 6 right at the portion facing the recess 23.

It should be observed that the severally mentioned picking-up position coincides with the position occupied by the portion of anchoring annular structure 6 intercepted by the gripping device 18 during the operation of picking up the anchoring annular structure 6 itself.

Preferably, the grip member 25 comprises a gripper 26 preferably fork-like, i.e. provided with at least four gripping prongs disposed in pairs facing each other.

In the preferred embodiment of the invention, the fork-like gripper 26 comprises six gripping prongs 26a disposed in pairs facing each other (FIG. 8). In particular, a first pair of prongs 26a is designed to be active within the recess 23 and the further two pairs of prongs 26a are respectively active at end portions of the fins 24 of the opposite abutment wall 22 relative to the recess 23.

In the preferred embodiment of the invention, preferably the picking up device 18 comprises a position compensating element 25a active on the grip member 25. Such position compensating element 25a is designed to calibrate a grasping movement of the grip member 25 for grasping the anchoring annular structures 6.

The position compensating element 25a operates stopping the travel of the prong/s 26a of the gripper 26 which contact the anchoring annular structure 6 in the front portion 6c thereof as soon as the same is contacted by the prongs themselves, so that the remaining prongs continue the travel thereof grasping the anchoring annular structure 6.

Preferably, the position compensating element 25a comprises a reloading device designed to bring the prongs 26a of the gripper 26 to an initial pre-established position upon completing each gripping operation.

Preferably, the housing seat 21 comprises a lead-in shim 27 having an inclined surface 27a designed to position the anchoring annular structure 6 against the abutment wall 22 (FIG. 6). The inclined surface 27a has the direct inclination thereof towards the abutment wall 22, i.e. it is inclined towards the abutment wall 22. Thus, the operation of loading the basket 17 with the anchoring annular structures 6 is considerably facilitated given that it does not require the exact positioning of the annular structure 6 near the abutment wall 22.

Preferably, the basket 17 comprises stabilising members 28 provided for engaging the anchoring annular structures 6. The stabilising members 28 are placed at the lower part relative to the support members 19.

The expression "placed at the lower part", is used to indicate positioning below, i.e. positioning at a position which, with the basket operating, it is placed at a lower height.

Preferably, each stabilising member 28 comprises a housing seat 29 designed to come into contact with an anchoring annular structure 6. The housing seat 29 comprises an abutment wall 30 designed to receive in a resting position the rear portion of an anchoring annular structure 6.

The abutment wall 30 of the housing seat 29 of the stabilising member 28 prevents any macroscopic movement of the anchoring annular structure 6 during the movement thereof.

In the preferred embodiment of the invention, preferably the basket 17 comprises actuating members 31 active on the stabilising members 28 designed to vary the distance between the stabilising members 28 and the support members 19.

Preferably, the actuating members 31 (FIG. 6) comprise a driving member 32 which drives a worm screw 33. In the preferred embodiment of the invention the driving member 32 is a hand wheel which can be actuated by an operator. On the worm screw 33 there is mounted a lead nut 34 rigidly connected to the stabilising members 28. The worm screw 33 develops in a direction substantially perpendicular to a path for the advancement of the support members 19. By rotating the worm screw 33 the driving member 32, determines the raising and lowering of the lead nut 34 and thus the approaching and the moving away of the stabilising members 28 from the support members 19.

Preferably, the basket 17 comprises second advancing members 35 active on the stabilising members 28 and synchronous with the first advancing members 20 for moving the support members 19 and the stabilising members 28 in synchronism.

Preferably, the first advancing members 20 and the second advancing members 35 respectively comprise two pulleys 36 (only one of which is shown in FIG. 6) on which there is wound a respective belt or chain 37.

At least one of the two pulleys 36 is interlocked with an electric motor 38.

Preferably, the electric motor 38 is directly active on the support members 19 alone or on the stabilising members 28.

In a preferred embodiment of the invention—shown in the attached figures—the electric motor 38 acts on the support members 19.

In order to allow motion from the electric motor 38 to the members on which it is not directly active, there is provided for a return group 39. In the preferred embodiment, the return group 39 develops between the electric motor 38 and the stabilising members 28.

Preferably, the return group 39 comprises an active transmission 40 between the electric motor 38 and a slide 41 to which the stabilising members 28 are connected.

The slide 41, integrally connected to the lead nut 34, thus movable vertically on the broached bar 45, receives the motion from the motor 38 through the transmission 40 and the broached bar 45, and through another angular return means mounted therewithin, rotates the lower bell 37 (FIG. 6), approaching and moving the support members 19 and the stabilising members 28 away with respect to each other.

Preferably, the housing seats 21, 29 of the support members 19 and the stabilising members 28 are placed along the whole extension of the belt or chain 37.

Thus, the support members 19 and the stabilising members 28 perform an out travel towards the picking-up position and a return travel from the same.

It should be observed that, preferably, the belts or chains 37 of the two advancing members 20, 35 rotate anticlockwise, i.e. one rotates clockwise and the other anticlockwise.

Preferably there is provided for a slide 43 associated with the basket 17. The slide 43 is movable between a first loading position of the basket 17 and an operating position of the basket 17.

Preferably, the movement of the slide 43 occurs along a direction substantially parallel to the direction of extension of the belts or chains 37.

In other words, the movement of the slide 43 occurs along a direction substantially perpendicular to the lying planes of the anchoring annular structures 6 when loaded on the basket 17.

Preferably, the slide 43 comprises a support structure 44 to which the first advancing members 20, the second advancing members 35, the support members 19 and the stabilising members 28 are constrained.

In the preferred embodiment of the invention, there is preferably provided for a plurality of baskets 17 each of said baskets being designed to house a homogeneous group of anchoring annular structures 6.

The process according to the invention implies the use of a storage region 11 for at least one basket 17 containing a plurality of anchoring annular structures 6 and at least one forming drum 13 associated with a processing station 10 designed to receive pairs of anchoring annular structures 6 during the processing of a tyre being formed.

The feeding of the anchoring annular structures 6 to said processing station 10 comprises picking up, by means of a picking up device 18, the anchoring annular structures 6 from the basket 17 at a predetermined picking-up position that does not change on changing of the types of the anchoring annular structures 6.

Furthermore, the process comprises feeding anchoring annular structures 6 to support members 19 provided on the basket 17.

Furthermore, there are provided for the functions of moving each support member 19 along a first path between an initial position and the picking-up position and picking up the anchoring annular structure 6 from the support member 19 occupying the picking-up position.

According to these functions it is possible to continuously feed the picking-up position with anchoring annular structures.

Preferably, the anchoring annular structures 6 are laid in housing seats 21 of the support members 19.

Thus, the anchoring annular structures 6 are "hanged" in the housing seats 21 and, given the typical annular shape thereof, the diameter of each anchoring annular structure 6 does not affect the position that the latter assumes in the housing seat 21.

The picking up device 18 picks up the anchoring annular structures 6 by at least partly entering the housing seats 21.

The at least partial entry of the picking up device 18 inside the housing seats 21 allows the portion for picking up each anchoring annular structure 6 to actually coincide with the portion engaged in the housing seat 21.

According to the invention, moving each support member 19 along a second path between the picking-up position and the initial position after picking up the anchoring annular structure 6 is preferably provided for.

Preferably, each anchoring annular structure 6 is picked up from the basket 17 at a picking up portion of the same placed inside a single circular sector.

Such picking up portion may be continuous or discrete.

Preferably, the width of the circular sector containing the picking up portion is comprised between about 1° and about 90°, even more preferably such width is comprised between about 1° and about 30°. In a preferred embodiment of the invention, the width of the circular sector containing the pricking up portion is comprised between about 5° and about 15°.

It should be observed that the severally mentioned picking-up position coincides with the position occupied by the portion of anchoring annular structure 6 intercepted by the picking up device 18 during the operation of picking up the annular structure itself.

In particular, the picking-up position coincides with the position occupied by the portion of anchoring annular structure 6 intercepted by the gripper 25 of the gripping device 18.

According to what is described above, the anchoring annular structures 6 are disposed in an orderly line in the support members 19 of the basket 17. The support members 19 are moved approaching the picking-up position until the most advanced anchoring annular structure 6 reaches such position.

The picking up device 18 reaches the picking-up position and grasps the anchoring annular structure 6 present therein.

Such operation is carried out by picking up the anchoring annular structure 6 using a portion thereof contained in a single circular sector (as described above).

The support members 19 are thus advanced to bring a further anchoring annular structure 6 in the picking-up position.

Preferably, the feeding of the anchoring annular structures 6 to the support members 19 comprises stabilising each anchoring annular structure 6 by means of stabilising members 28 provided on the basket 17 and active on the anchoring annular structures 6 in diametrically opposite positions relative to the support members 19.

Preferably, moving the support members 19 and the stabilising members 28 in synchronism towards the picking-up position and away therefrom is provided for.

The stabilisation of the anchoring annular structures 6 prevents the same from slipping or oscillating during the storage and transfer thereof towards the picking-up position.

According to the invention moving the stabilising members 28 away from and approaching relative to the support members 19 on changing the type of anchoring annular structures 6 loaded on the basket 17 is preferably provided for.

Thus, regardless of the type of anchoring annular structure 6 (for example the diameter) it is achieved that the same does not oscillate or slip.

Preferably, supplying the basket 17 with anchoring annular structures 6 pulling the basket 17 out of an operating position and making it face a loading region of the storage region 11 is provided for.

Preferably, such operation occurs by pulling the basket along a direction substantially perpendicular to the lying plane of the anchoring annular structures 6 when the latter are disposed in the basket 17.

Thus, the overall dimensions required for the plant are minimised, given that the baskets exceed the overall dimensions usually occupied solely for the time required for filling thereof.

Furthermore, it is preferable to provide for the function of providing a plurality of baskets 17 in the storage region 11 each of said baskets being designed to house a homogeneous group of anchoring annular structures 6, a picking-up position being defined for each basket.

Preferably, the baskets 17 are disposed on a single row or on several superimposed rows. The baskets 17 are disposed with the directions of advancement of the support members 19 parallel to each other.

In other words, the baskets 17 are disposed so as to face the picking up positions in the area interested by the picking up device 18.

The method for managing the production cycle of a plant for building tyres for vehicle wheels according to the present invention shall be described hereinafter with reference to the plant 1 outlined above.

The aforementioned method comprises feeding a plurality of anchoring annular structures 6 to the storage region 11, picking up the anchoring annular structures 6 from the storage region 11 at a predetermined picking-up position that does not change on changing of the types of the anchoring annular structures 6, feeding the picked-up anchoring annular structures 6 to the processing station 10 associated with the forming drum 13.

The method of the present invention preferably comprises the additional actions of feeding in succession each anchoring annular structure 6 in the picking-up position.

Preferably the action of feeding a plurality of anchoring annular structures 6 to the storage region 11 comprises orderly arranging the anchoring annular structures 6 supporting them at a support portion of the same.

Preferably the action of picking up the anchoring annular structures 6 from the storage region 11 at a predetermined picking-up position that does not change on changing of the types of the anchoring annular structures comprises picking up each anchoring annular structure 6 at a picking up portion coinciding with said support portion.

Supporting the anchoring annular structures at the picking up portion allows the picking-up position to be actually occupied by the anchoring annular structure 6 to be picked up.

Preferably, the action of picking up said anchoring annular structures from the storage region comprises picking up each anchoring annular structure 6 at a picking up portion of the same placed inside a single circular sector of the anchoring annular structure.

According to this characteristic it is not compulsory to certainly know the absolute position of the entire anchoring annular structure 6 in order to perform the picking up thereof.

In a preferred embodiment of the invention, such picking up portion is one, i.e. the anchoring annular structure 6 has only one picking up portion contained in a single circular sector.

Such picking up portion may be continuous or discrete.

Preferably, the width of the circular sector containing the picking up portion is comprised between about 1° and about 90°, even more preferably such width is comprised between about 1° and about 30°. In a preferred embodiment, the width of the circular sector containing the picking up portion is comprised between about 5° and about 15°.

Preferably, each anchoring annular structure 6 is separated from another at least at the respective picking up portions.

Separating the anchoring annular structures 6 from each other allows picking up the same without interfering with the anchoring annular structures 6 still to be picked up.

In a preferred embodiment of the invention, the action of feeding an anchoring annular structure 6 to the position previously occupied by the picked-up anchoring annular structure 6 is also provided for.

Preferably, the action of feeding a plurality of anchoring annular structures 6 to the storage region 11 comprises feeding a plurality of groups of anchoring annular structures 6 to the storage region 11. The action of picking up the anchoring annular structures 6 is defined for each group. In other words, a relative picking-up position is defined for each group of anchoring annular structures 6.

Being provided with a plurality of groups of anchoring annular structures, allows changing the type of anchoring annular structure 6 to be transferred to the forming drum 13 without interrupting the transfer continuity, i.e. without reducing the maximum production capacity of the plant.

The invention claimed is:

1. A method for managing the production cycle of a plant for building a tyre for vehicle wheels:
    feeding a plurality of anchoring annular structures, each comprising a bead ring and a filling insert, to a basket within a storage region, wherein the basket feeds the anchoring annular structures in succession to a predetermined picking-up position in three dimensional space, said predetermined picking-up position does not change if anchoring annular structures of the plurality of anchoring annular structures have differing diameters;
    supporting each anchoring annular structure in the basket by a respective supporting member, each supporting member includes an abutment wall comprising a pair of coplanar fins separated from one another by a recess,
        wherein each anchoring annular structure is supported by the respective supporting member at a respective support portion that is defined by a single circular sector at an upper portion of the anchoring annular structure's internal circumference, and
        wherein an uppermost support portion of each anchoring annular structure spans a corresponding recess of its respective supporting member;
    picking up a first anchoring annular structure of the plurality of anchoring annular structures from its uppermost support portion by inserting a gripper into the first anchoring annular structure's corresponding recess of its respective supporting member when the first anchoring annular structure reaches the predetermined picking-up position; and carrying with said gripper the first anchoring annular structure by its uppermost support portion to a processing station associated with a forming drum.

2. The method as claimed in claim 1, comprising: feeding each anchoring annular structure in succession to the predetermined picking-up position.

3. The method as claimed in claim 2, wherein said feeding a plurality of anchoring annular structures to said storage region comprises: arranging the anchoring annular structures in an orderly line.

4. The method as claimed in claim 3, comprising: separating each anchoring annular structure from other anchoring annular structures at least at their respective uppermost support portions.

5. The method as claimed in claim 1, further comprising: feeding a second anchoring annular structure to a position previously occupied by the picked-up anchoring annular structure.

6. The method as claimed in claim 1, wherein said feeding a plurality of anchoring annular structures to said storage region comprises: feeding a plurality of groups of anchoring annular structures to said storage region wherein each group of anchoring annular structures is assigned to a respective basket within the storage region, and said picking up said first anchoring annular structure from said storage region comprises picking up each anchoring annular structure of each group of anchoring annular structures from its respective basket within the storage region.

* * * * *